(12) United States Patent
Fima

(10) Patent No.: US 7,970,494 B2
(45) Date of Patent: Jun. 28, 2011

(54) SYSTEMS AND METHODS FOR MONITORING RELIEF VALVE DRAIN IN HOT WATER HEATER

(75) Inventor: Giovanni Fima, Carlsbad, CA (US)

(73) Assignee: LiquidBreaker, LLC, Carlsbad, CA (US)

( * ) Notice: Subject to any disclaimer, the term of this patent is extended or adjusted under 35 U.S.C. 154(b) by 27 days.

(21) Appl. No.: 12/622,732

(22) Filed: Nov. 20, 2009

(65) Prior Publication Data

US 2010/0133258 A1 Jun. 3, 2010

Related U.S. Application Data

(63) Continuation-in-part of application No. 10/668,897, filed on Sep. 23, 2003, now abandoned, which is a continuation-in-part of application No. 10/252,350, filed on Sep. 23, 2002, now Pat. No. 6,766,835.

(51) Int. Cl.
*G05D 11/00* (2006.01)
(52) U.S. Cl. ............ 700/282; 137/62; 137/66; 236/21 B
(58) Field of Classification Search .................. 700/282; 137/62, 66; 236/21 B
See application file for complete search history.

(56) References Cited

U.S. PATENT DOCUMENTS

| | | | | |
|---|---|---|---|---|
| 392,803 | A | | 11/1888 | Herndon |
| 2,126,564 | A | * | 8/1938 | Leins ............................. 136/220 |
| 2,409,947 | A | * | 10/1946 | Mantz ............................. 137/66 |
| 2,749,043 | A | * | 6/1956 | Eskin .......................... 236/21 B |
| 2,967,523 | A | * | 1/1961 | Wobbe ......................... 122/13.3 |
| 3,154,248 | A | * | 10/1964 | Fulton et al. ................. 236/21 B |
| 3,307,613 | A | | 3/1967 | Rexer |
| 3,662,950 | A | * | 5/1972 | McIntosh et al. ............ 236/92 C |
| 3,873,808 | A | * | 3/1975 | Patton ............................ 392/441 |
| 4,180,088 | A | * | 12/1979 | Mallett ....................... 137/87.03 |
| 4,291,388 | A | | 9/1981 | Ecker, Jr. et al. |
| 4,343,987 | A | * | 8/1982 | Schimbke et al. ............. 392/312 |
| 4,371,779 | A | * | 2/1983 | Maynard et al. .............. 392/449 |
| 4,414,994 | A | | 11/1983 | Hogan |
| 4,608,560 | A | | 8/1986 | Allgood |
| 4,635,668 | A | | 1/1987 | Netter |
| 4,730,637 | A | * | 3/1988 | White ............................. 137/62 |
| 4,848,654 | A | * | 7/1989 | Zelczer et al. ................ 236/49.4 |
| 5,042,520 | A | | 8/1991 | Reznik |
| 5,071,066 | A | * | 12/1991 | Willson ....................... 236/92 C |
| 5,113,892 | A | | 5/1992 | Hull et al. |
| 5,139,044 | A | | 8/1992 | Otten et al. |
| 5,267,587 | A | * | 12/1993 | Brown ...................... 137/624.12 |
| 5,441,070 | A | | 8/1995 | Thompson |
| 5,568,825 | A | * | 10/1996 | Faulk ........................ 137/624.11 |
| 5,637,789 | A | * | 6/1997 | Lawson ...................... 73/40.5 R |
| 5,740,031 | A | | 4/1998 | Gagnon |
| 5,908,980 | A | | 6/1999 | Hwang |
| 5,950,667 | A | * | 9/1999 | Nicewonger et al. ......... 137/459 |
| 5,956,248 | A | | 9/1999 | Williams et al. |

(Continued)

*Primary Examiner* — Michael D Masinick
(74) *Attorney, Agent, or Firm* — Fish & Associates, PC

(57) ABSTRACT

A system is disclosed that advantageously monitors a status of a relief valve coupled to a water heater or other pressure vessel. By monitoring the relief valve, the system can limit the energy and water wasted resulting from the relief valve's failure. The system can have first and second sensors that monitor a temperature and pressure within the relief valve, and a water flow from the relief valve, respectively. If the temperature or pressure within the relief valve exceeds predetermined thresholds, or a water flow from the relief valve continues for greater than a predetermined interval, the system can restrict a flow of gas, electric current, or water to the water heater.

18 Claims, 7 Drawing Sheets

U.S. PATENT DOCUMENTS

| | | | |
|---|---|---|---|
| 5,971,011 A * | 10/1999 | Price | 137/460 |
| 6,035,240 A | 3/2000 | Moorehead et al. | |
| 6,061,603 A | 5/2000 | Papadoppulous et al. | |
| 6,104,987 A | 8/2000 | Farnsworth | |
| 6,185,986 B1 * | 2/2001 | Nelson et al. | 73/40.5 R |
| 6,195,002 B1 | 2/2001 | Evans, Jr. et al. | |
| 6,199,573 B1 * | 3/2001 | Paskiewicz | 137/79 |
| 6,209,576 B1 * | 4/2001 | Davis | 137/487.5 |
| 6,374,846 B1 * | 4/2002 | DeSmet | 137/15.01 |
| 6,374,850 B1 | 4/2002 | Timm | |
| 6,510,350 B1 | 1/2003 | Steen, III et al. | |
| 6,520,003 B1 * | 2/2003 | Fox | 73/40.5 R |
| 6,798,341 B1 * | 9/2004 | Eckel et al. | 340/521 |
| 7,225,056 B2 * | 5/2007 | Bolduan et al. | 700/282 |
| 7,306,008 B2 * | 12/2007 | Tornay | 137/624.11 |
| 7,711,651 B2 * | 5/2010 | Baraty | 705/63 |
| 2004/0163705 A1 | 8/2004 | Uhler | |
| 2005/0126635 A1 * | 6/2005 | Addink et al. | 137/487.5 |
| 2006/0108003 A1 * | 5/2006 | Bradford et al. | 137/487.5 |

* cited by examiner

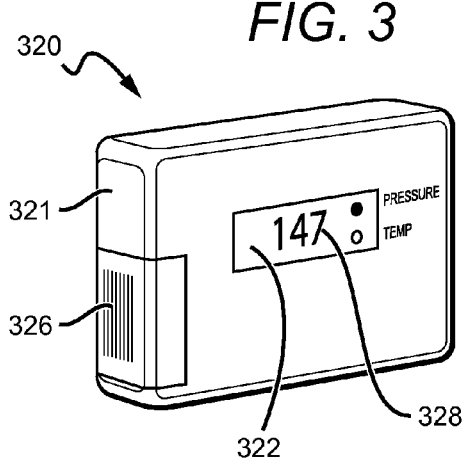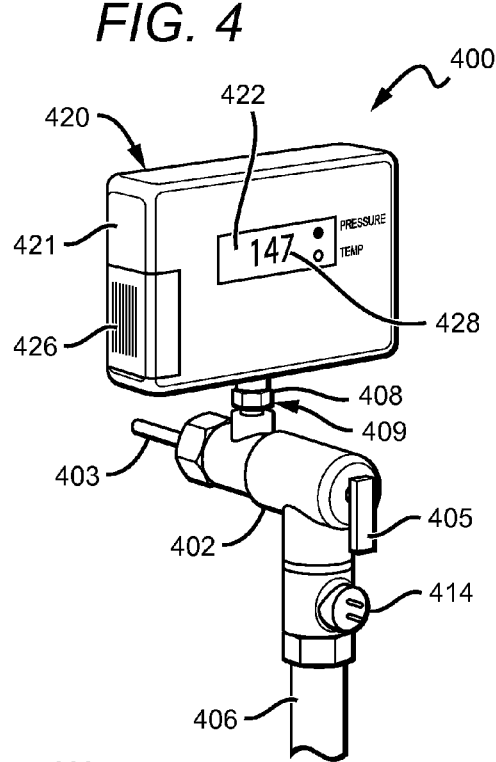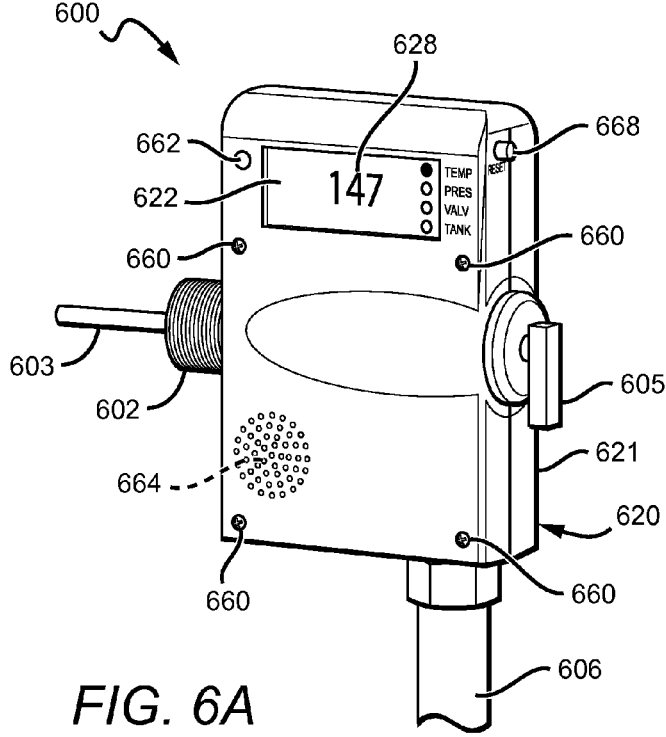

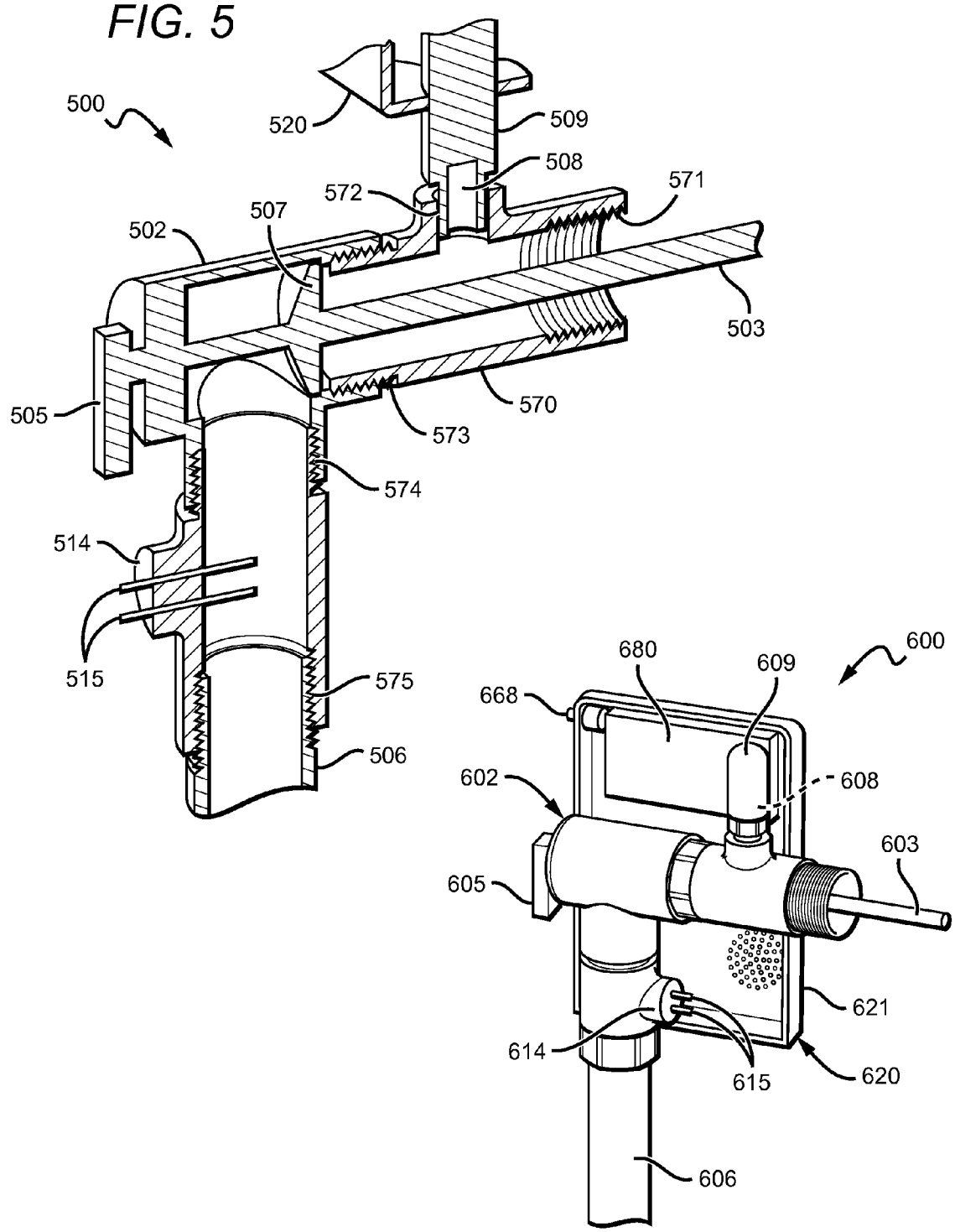

*FIG. 6C*

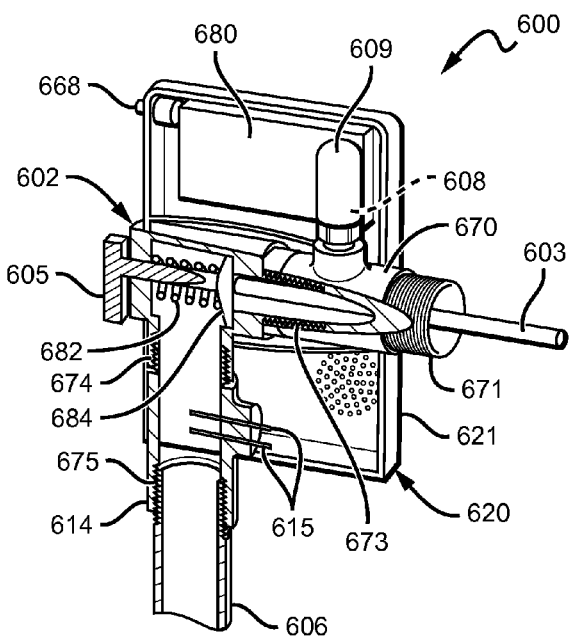

*FIG. 8*

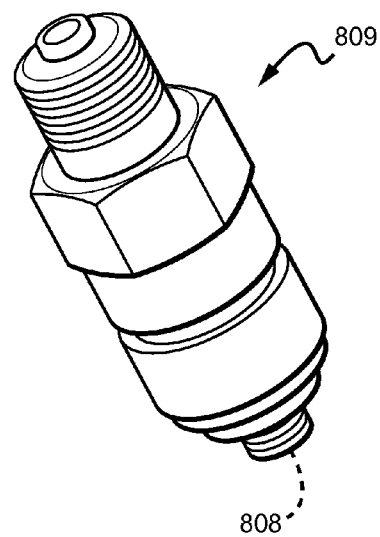

*FIG. 9*

Step 910: receiving information about a system that monitors a relief valve coupled to a water heater of the structure covered by the insurance policy, wherein the information indicates if the structure has the system to monitor the relief valve such that a flow of gas of electric current to the water heater is restricted if a temperature or pressure of the water heater exceeds predetermined thresholds

↓

Step 920: determining the insurance premium based upon the information, and wherein the premium is less than a second premium that is based upon a second information that indicates the structure lacks the system.

↓

Step 925: electronically communicating the determined premium to a customer

SYSTEMS AND METHODS FOR MONITORING RELIEF VALVE DRAIN IN HOT WATER HEATER

This application is a continuation-in-part of U.S. Utility application having Ser. No. 10/668,897 filed on Sep. 23, 2003, which is a continuation-in-part of U.S. Pat. No. 6,766,835 filed on Sep. 23, 2002. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is water heaters.

BACKGROUND

Hot water heaters and other pressure vessels typically have a relief valve that opens to expel fluid when a temperature or pressure within the water heater exceeds predetermined levels. In this manner, explosions can be prevented by reducing the volume of fluid in the water heater, which reduces the temperature and pressure within the water heater. However, the relief valves often develop calcium, limestone and other mineral deposits over time that can cause the relief valves to fail.

To prevent hot water heaters from exploding when the relief valve fails to open, it is known to monitor a temperature or pressure of the water heater. Exemplary devices are discussed in U.S. Pat. No. 6,766,835 issued in July 2004, and U.S. Utility application with Ser. No. 12/391,018 filed on Feb. 23, 2009. By monitoring the temperature or pressure of the water heater, energy to the water heater can be restricted prior to the temperature or pressure of the water heater becoming critical. However, such monitors fail to detect a situation in which the relief valve is stuck in an open position, which can lead to flooding and wasting a large amount of water and energy before the problem is detected. This is especially problematic since many relief valves expel water out of the sight of users, which increases the difficulty of manually detecting a failed valve.

Thus, there is still a need for a system that monitors a relief valve of a water heater or other pressure vessel, and restricts an energy or water flow to the water heater when the relief valve is stuck in an open position.

SUMMARY OF THE INVENTION

The inventive subject matter provides apparatus, systems and methods for monitoring a relief valve that is coupled to a water heater and that regulates a flow of water to a drain pipe. Preferred systems include (a) a first sensor that monitors a temperature or pressure of the water heater, and (b) a second sensor that monitors water flow to the drain pipe. A controller can be programmed to restrict a flow of gas, electric current, or other energy source to the water heater in response to signals produced by at least one of the first or second sensors.

Contemplated water heaters include storage water heaters, tankless or instantaneous water heaters, as well as all other commercially available water heaters or boilers. The systems and methods described herein can also be used with any pressure vessel having a pressure relief valve. As used herein, the term "restricts" includes shutting off, reducing, or otherwise at least partially limiting a flow. As used herein, the term "monitors" includes measuring, sampling, and analyzing.

Should the relief valve fail to open, the system restricts an energy flow to the water heater, to thereby prevent an explosion or other damage to the water heater or surrounding structures. This extends the life of the water heater by allowing a user to simply replace the failed relief valve rather than the water heater itself. In addition, by monitoring a flow of water to the drain pipe, the system can detect if the relief valve is stuck in an open position. In this manner, the system can advantageously prevent the potential waste of significant amounts of water and energy resulting from the failed relief valve.

Contemplated systems could also restrict a flow of water to the water heater. The systems can include a valve actuator that operates a valve to control a fluid flow to the water heater. The controller can communicate with the valve actuator to restrict the fluid flow when (a) a temperature or pressure of the water heater or (b) a flow of water in the drain pipe exceeds predetermined thresholds. Thus, for example, if the relief valve is stuck in an open position, water flow to the water heater can be restricted to thereby limit the amount of water expelled through the failed relief valve.

In some contemplated embodiments, the system could have a sensor coupled to the relief valve that monitors a pressure and temperature of the water heater to produce a first signal. The system can also have a controller coupled to the first sensor, and that is configured to activate a visual or audible alarm as a function of the first signal.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 is a close-up view of a controller of a system for monitoring a status of a relief valve coupled to a water heater.

FIG. 4 is an alternative embodiment of a controller housing that is coupled to a relief valve.

FIG. 5 is a sectional view of the relief valve and controller housing of FIG. 4.

FIGS. 6A-6C are yet another alternative embodiment in which a controller and a relief valve share the same housing.

FIG. 8 is a diagram of a controller that monitors a status of a relief valve.

FIG. 9 is a flowchart of a method for reducing insurance premiums.

DETAILED DESCRIPTION

Figure 1:
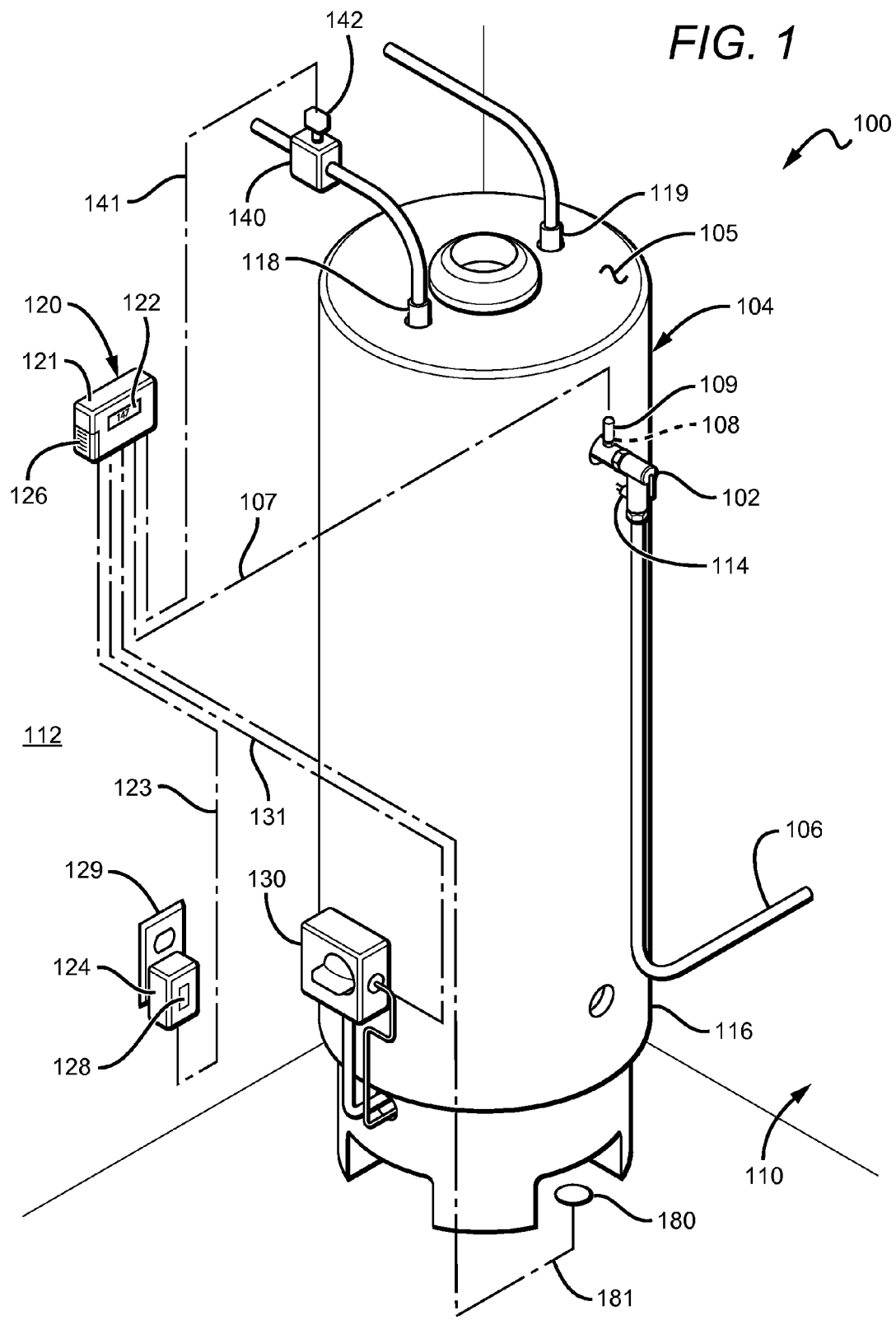
FIG. 1 is a perspective view of a system for monitoring a status of a relief valve coupled to a water heater.

In FIG. 1, system 100 monitors a status of a relief valve 102 coupled to a water heater 104 of a residential, commercial, or other structure 110. The relief valve 102 is disposed between the water heater 104 and a drain pipe 106. Although the relief valve 102 is shown separately housed from the water heater 104, it is contemplated that the relief valve 102 could be integrated into the water heater 104.

The relief valve 102 can be configured to open when a pressure or temperature exceeds predetermined thresholds. In some embodiments, the relief valve can be configured to open when the pressure in the valve exceeds 150 psi or the temperature exceeds 210° F. However, the threshold values could be varied depending on the configuration of the relief valve or the water heater.

Any commercially suitable valve could be used including, for example, needle valves, ball valves, gate valves, poppet valves, plug valves, globe valves, butterfly valves, and diaphragm valves. An exemplary valve is the L100XL relief valve manufactured by Watts® Water Technologies. Contemplated relief valves can be formed from any commercially practical material including for example, brass, stainless steel, plastic, ceramic, bimetals, and any combination thereof. In addition, the relief valve 102 preferably has a closed bias (e.g., defaults to a closed position).

The drain pipe 106 can be disposed with an open end positioned within structure 110. However, the drain pipe 106 can alternatively be routed or otherwise configured to expel fluids externally to the structure 110 to reduce the possibility of flooding the structure 110.

Water heater 104 can have a tank 116 for holding water, although tankless water heaters are also contemplated. An inlet conduit 118 and an outlet conduit 119 can be coupled to an upper surface 105 or other commercially suitable location of the water heater 104. Water can flow through the inlet conduit 118 into the water heater 104, and can exit the water heater 104 through outlet conduit 119, for example. Though not shown, pipes or other fluid conduits can be coupled to each of the inlet and outlet conduits 118-119 in order to carry water to and from the water heater 104, respectively.

The inlet conduit 118 can include a valve actuator 142 coupled to a water inlet valve 140 that controls fluid flow to the water heater 104. The valve actuator 142 could be of any commercially available design including for example, mechanical, magnetic (e.g., a solenoid), electric, pneumatic, and hydraulic.

The valve actuator 142 can be coupled to the controller 120 via wired connection 141, although wireless connections are also contemplated. In this manner, controller 120 can communicate with the valve actuator 142 and restrict a flow of water to the water heater 104 if the relief valve 102 is stuck in an open position, for example. Restricting the water flow to the water heater 104 can significantly reduce the volume of water wasted and expelled through the failed relief valve.

A first sensor 108 can be configured to monitor a temperature or pressure of the water heater 104 to produce a first signal. The first sensor 108 can be coupled to the relief valve 102 by a nipple shown in FIG. 5 that is threaded or otherwise coupled to the relief valve 102. It is also contemplated that the first sensor 108 can be integrated into the relief valve 102, or disposed in any suitable location such that the first sensor 108 can detect the pressure or temperature of the water heater 104. Monitoring the pressure or temperature of the water heater 104 advantageously provides a backup system to the relief valve 102 should the relief valve 102 fail to open.

The first sensor 108 can include a temperature sensor such as a thermocouple or a thermistor and a pressure sensor. A first signal can be produced by the first sensor 108 or optional electronics (not shown) coupled to the first sensor 108. Although the first sensor 108 can be configured to continually produce signals that relay the current temperature or pressure of the water heater 104, it is also contemplated that the first sensor 108 could be configured to produce signals when it detects that the temperature or pressure exceeds predetermined thresholds.

Sensor housing 109 can include the first sensor 108 that can monitor both pressure and temperature of the water heater 104. However, it is contemplated that separately housed temperature or pressure sensors could alternatively be used.

A second sensor 114 can also be coupled to the relief valve 102, and configured to monitor water flow to the drain pipe 106 to produce a second signal. Any commercially available sensor could be used that monitors the fluid flow within the drain pipe 106 including, for example, thermal, electromagnetic (e.g., a turbine with a Hall's effect reader), mechanical (e.g., a vane), chemical, optical, ultrasonic, capacitance, inductive, and any combination thereof. For example, with a turbine flow sensor, the water flow can be computed from the number of revolutions of the turbine per unit of time (e.g., revolutions per minute).

The second sensor 114 preferably measures a flow of water over time that passes by the second sensor 114. For example, once a flow of water is detected, a timer such as that shown in FIG. 7 can be used to time the flow. If water flow is detected for greater than a defined time period, energy or water flow to the water heater 104 can be restricted. It is contemplated that the time period could be varied as needed to properly determine if the relief valve 102 is stuck in an open position.

It is contemplated that one or both of the first and second sensors 108 and 114 could be disposed within the relief valve 102 or elsewhere in system 100.

One or more of the sensors 108 and 114 could additionally include electronics (not shown) that filter, amplify, or convert a signal from the sensor to assist in the signal's interpretation. For example, the electronics could convert at least one of a measured flow rate, temperature, and pressure into an electrical signal. Alternatively, a device external to one or both sensors could convert the signal. For example, the device could be adjacent to, or otherwise coupled to, the sensor(s).

The first and second sensors 108 and 114 can be coupled to controller 120, such that the controller 120 can receive signals from the sensors 108 and 114. Each of the sensors 108 and 114 can connect to the controller 120 either directly or indirectly via a wired connection, wireless connection, or combination thereof. As shown in FIG. 1, the first and second sensors 108 and 114 are coupled to the controller 120 via wired connection 107. However, it is contemplated that one or both of the first and second sensors 108 and 114 could be indirectly connected to the controller 120 such as by a signal amplifier or other signal modifier. Contemplated wired connections include, for example, IP over power line, RS-232, Ethernet, USB, and Firewire. Contemplated wireless connections include, for example, WIFI, Bluetooth, infrared and radio frequency.

The controller 120 can be disposed in controller housing 121, and can be configured with the necessary software or hardware to monitor signals received from the sensors 108 and 114, and communicate with the energy valve actuator 130 via connection 131 to restrict a flow of gas, electric current, or other energy source to the water heater 104 when (1) the first sensor 108 detects a temperature or pressure of the water heater 104 exceeds predetermined thresholds, or (2) water flows to the drain pipe 106 for greater than a predetermined interval.

For example, the relief valve 102 can typically be constructed to open when a pressure exceeds 150 psi or a temperature exceeds 210° F. In this example, a signal from the first sensor 108 could be communicated to a controller 120, which can restrict, or cause a restriction of, a flow of gas, electric current, or other energy source to the water heater 104 if a temperature or pressure of the water heater 104 exceeds 155 psi or 215° F., respectively. Since water heaters typically can withstand pressures up to 300 psi, system 100 includes a sufficient safety margin to prevent any explosion of the water heater 104. In another example, the controller 120 could direct that the gas flow to the water heater 104 be restricted if water flow is detected to or though the drain pipe 106 for greater than one minute. Although specific parameters and thresholds have been discussed, such parameters and thresholds are merely exemplary and the actual values could be varied depending on the components of the system 100.

The controller 120 can optionally include electronics (not shown) configured to receive a signal from the first and second sensors 108 and 114, as well as any additional sensors included in the system 100. In addition, the electronics can be configured to allow the controller 120 to communicate a signal to and thereby control one or more valve actuators.

In some contemplated embodiments, the controller 120 can be coupled to a display 122 to quickly apprise a user of status information of the water heater 104 or relief valve 102, for example. The status information can include, for example, the current pressure and temperature of the water heater 104, and the current status of the relief valve 102 (e.g., open/closed/failed).

The controller 120 can also have one or more lights or audio emitters shown in FIG. 6A, which can alert a user of a problem with the water heater 104 or relief valve 102. Such problems might include, for example, relief valve 102 stuck in an open position, the pressure or temperature of the water heater 104 exceeding predetermined thresholds, a low battery power, and a lack of power to the controller 120. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The controller 120 can receive power via cable 123 from a power adapter 124 that is user-pluggable into a standard power outlet 129. The power adapter 124 advantageously allows a user to power the controller 120 without requiring additional electrical wiring. Alternatively, the controller 120 could be directly wired to a line voltage without utilizing power adapter 124. It is also contemplated that the controller 120 can have a battery power supply (not shown) accessible by battery cover 126, which can function as a primary power source or a backup power source for the controller 120. In another alternative embodiment, the controller 120 could be powered using a photovoltaic cell (not shown).

The power adapter 124 can have electronics 128 that allow the controller 120 to communicate over a network connection, such as by using IP over power or X10 modules to communicate over electrical wiring. Alternatively or additionally, electronics 128 could be configured to allow the controller 120 to communicate using other commercially suitable wired or wireless connections. Although electronics 128 are shown disposed in power adapter 124, it is also contemplated that electronics 128 could be disposed within the controller 120 or housed externally to the controller 120.

Controller 120 can advantageously use the network connection to communicate with a remote monitor, which can include, for example, a personal computer or a dedicated panel such as the OmniBreaker panel manufactured by Liquid Breaker, Inc. in Carlsbad, Calif. The connection with a remote monitor advantageously allows multiple water heaters and relief valves to be monitored from one location. In some embodiments, the remote monitor can receive signals from the controller 120, which can alert the remote monitor to the status of the water heater 104 or relief valve 102. It is also contemplated that the remote monitor could communicate one or more signals to the controller 120 and thereby direct the controller 120 to (a) restrict a flow of gas or electric current or (b) a flow of water to the water heater 104. It is further contemplated that such communication could be converted and sent as an email or text message by the controller 120 or remote monitor (not shown), for example.

Figure 2:
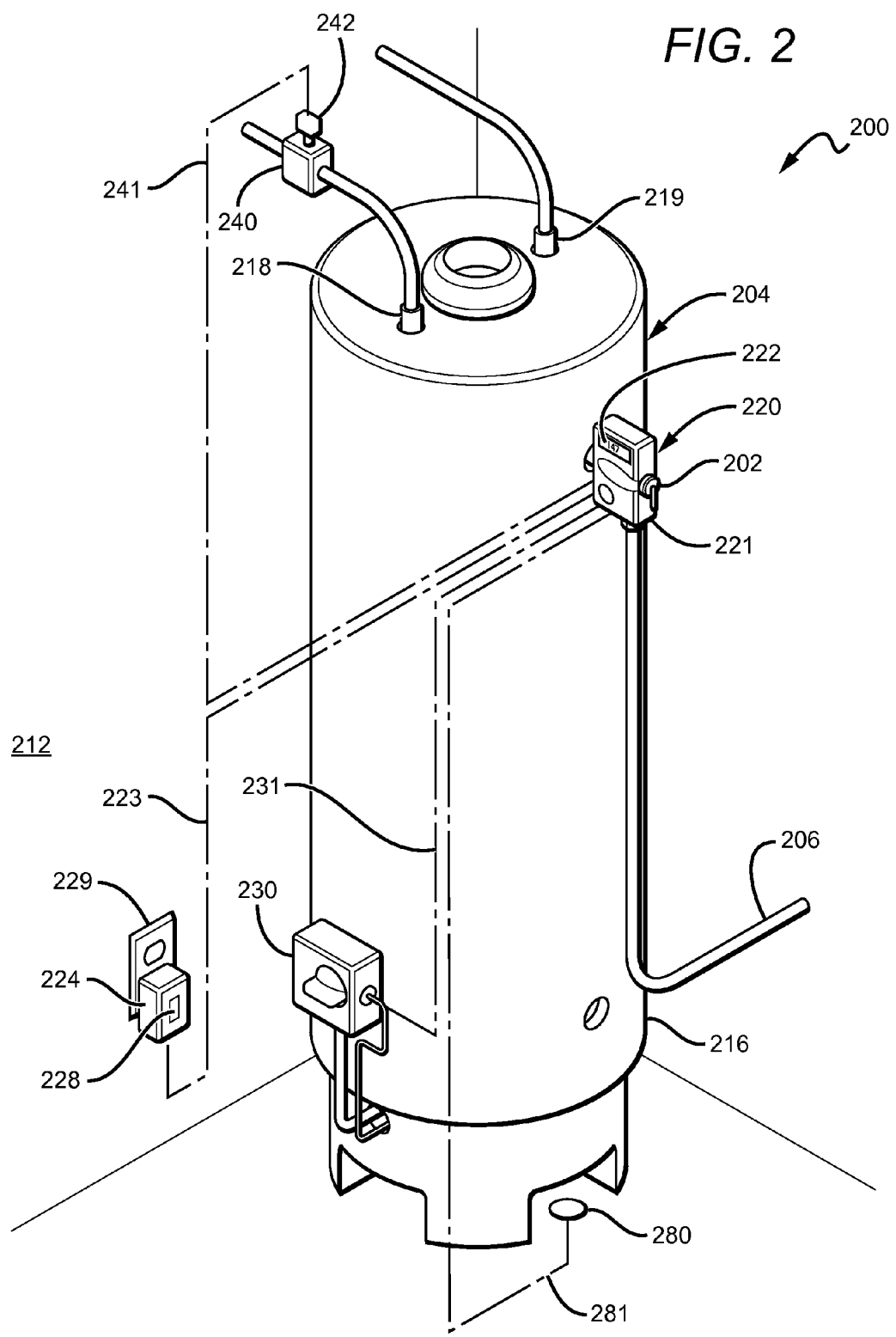
FIG. 2 is a perspective view of another embodiment of a system for monitoring a status of a relief valve coupled to a water heater.

The controller 120 could be integral with the water heater 104 as shown in FIG. 2, or be disposed separate from the water heater 104. Although the controller 120 is shown mounted to wall 112 of structure 110, the controller 120 could alternatively be disposed on or otherwise near the water heater 104 such as within a range of six feet. However, it is contemplated that the controller 120 could be disposed in any commercially practical location.

System 100 can optionally have a third sensor 180 configured to detect a presence of water. The third sensor 180 is preferably disposed beneath the water heater 104 such that any fluid of the water heater 104 can be detected. Third sensor 180 preferably connects to the controller 120 via a wireless connection 181, although wired connections are also contemplated. The third sensor 180 can advantageously be powered by an energy harvester, which eliminates the need for a battery or other power source and wiring. However, it is contemplated that the third sensor 180 could be coupled to a battery, photovoltaic cell, or other commercially suitable power source.

As shown in FIG. 2, the controller 220 can be coupled to the water heater 204, and the relief valve 202 can be at least partially disposed within the controller housing 221. With respect to the remaining numerals in FIG. 2, the same considerations for like components with like numerals of FIG. 1 apply.

FIG. 3 illustrates a close up view of an embodiment of a controller 320. Controller 320 is disposed within housing 321, which includes a battery cover 326 that opens to reveal a battery compartment (not shown). In some embodiments, the controller 320 can be connected to a line voltage or include a photovoltaic cell for solar power.

Controller 320 can have a display 322 quickly can apprise a user of a status of a water heater and a relief valve coupled to the water heater. Display 322 can cycle between a pressure 328 and a temperature of the water heater, and it is contemplated that the display 322 can also show, for example, a power status of the controller 320, a status of a relief valve, and a status of a water heater.

In FIG. 4, an alternative embodiment of system 400 is shown in which sensor housing 409 couples the relief valve 402 to the controller 420. The relief valve 402 has a temperature sensor 403 configured to open the relief valve 402 when temperature sensor 403 detects a temperature that exceeds a predetermined threshold. Although relief valves for residential water heaters typically are configured to open when a temperature is above 210° F., the threshold temperature will vary depending on the manufacturer of the relief valve and water heater. Relief valve 402 can also include a manual valve actuator 405 that allows a user to open the relief valve 402 by lifting the valve actuator 405.

Sensor housing 409 couples the relief valve 402 to the controller 420, and includes first sensor 408 that monitors a temperature and pressure in the relief valve 402. By coupling the relief valve 402 to a water heater (not shown) or other pressure vessel, the first sensor 408 can thereby monitor a temperature and pressure of the water heater.

A second sensor 414 can also be coupled to the relief valve 402, and configured to monitor a flow of water to the drain pipe 406. If the second sensor 414 detects continuous water flow for more than a defined time interval, it is assumed that the relief valve 402 has failed and is stuck in an open position. The defined time interval can be varied depending on the time required for the water heater to reduce its pressure using the relief valve. For example, if the relief valve requires no longer than thirty seconds to expel enough fluid to reduce the pressure or temperature of the water heater to below threshold levels, the second sensor 414 could be set to trigger an alarm should continuous water flow be detected for longer than one minute.

Though the sensors 408 and 414 are shown disposed in specific positions relative to the relief valve 402, each of the sensors 408 and 414 could be disposed in any location that allows the sensors 408 and 414 to monitor a pressure or temperature of the water heater and a flow of water exiting to the drain pipe 406, respectively. With respect to the remaining numerals in FIG. 4, the same considerations for like components with like numerals of FIG. 1 apply.

In FIG. 5, relief valve 502 includes a check valve 507 that opens when a pressure in the relief valve 502 exceeds a predetermined threshold. The relief valve 502 also includes temperature sensor 503 that opens the check valve 507 when a temperature exceeds a predetermined threshold. Although check valve 507 typically is configured to open when a temperature exceeds 210° F. or a pressure exceeds 150 psi, such values can vary depending on the relief valve's manufacturer.

Sensor housing 509 includes first sensor 508 that is configured to monitor a pressure and temperature within the relief valve 502. A nipple or T-shaped conduit 570 can couple sensor housing 509 to the relief valve 502 and a water heater (not shown). The conduit 570 can have threaded ends 571-573 that provide for removable coupling of the water heater (not shown), sensor housing 509, and the relief valve 502, respectively. Alternatively, conduit 570 could be coupled to the relief valve 502, sensor housing 509, or water heater by welding or any commercially suitable fastener. It is also contemplated that the first sensor 508 could be directly integrated into the relief valve 502.

A second sensor 514 can be configured to measure a water flow to the drain pipe 506. The second sensor 514 can be disposed to couple the drain pipe 506 and the relief valve 502, and preferably has threaded ends 574-575. The second sensor 514 has contacts 515 which produce a signal when water flows by the contacts 515 and temporarily connects the contacts 515 and completes a circuit. Although the second sensor 514 can be coupled to the controller 520 by a wired connection, wireless connections are also contemplated. With respect to the remaining numerals in FIG. 5, the same considerations for like components with like numerals of FIG. 1 apply.

FIGS. 6A-6C illustrate an embodiment of a system 600 that monitors a relief valve 602 housed within controller housing 621. Positioning the relief valve 602 within the controller housing 621 is advantageous because it (1) helps prevent accidental skin contact with the scalding relief valve 602 and (2) reduces any wiring between the controller 620 and the sensors 608 and 614. Although not shown, the relief valve 602 can be coupled to a water heater to allow for a reduction of pressure or temperature within the water heater (not shown).

Controller housing 621 can have screws 660 or other commercially suitable fasteners that join the front and back sections of the controller housing 621, and preferably provides for quick removal of the front section of controller housing 621. Although the screws 660 can provide easy access to the relief valve 602 for its repair, replacement, or removal, it is contemplated that any commercially suitable fastener could be used to couple the sections of the controller housing 621 including, for example, bolts, clips, snaps, hooks and loops, and other mechanical fasteners, glue and other adhesives, magnets, and combination(s) thereof.

The controller 620 can have a circuit board 680 that can be configured to assist the controller 620 in monitoring signals from the first sensor 608 and second sensor 614 and restricting a flow of gas or electric current to the water heater.

The controller 620 can also have one or more lights 662, or a speaker 664 or other audio emitter, all of which can be used to quickly apprise a user of the status of the relief valve 602. For example, should the controller 620 detect a problem with the relief valve 602, the controller 620 can illuminate light 662 or cause an alarm to be sounded through speaker 664. A reset button 668 or switch can be included on the controller 620 to allow a user to reset and thereby deactivate the visual or audible alarm produced by the light 662 or the speaker 664, respectively.

Controller 620 could be wall-mounted or disposed on or near the water heater. With respect to the remaining numerals in FIGS. 6A-6C, the same considerations for like components with like numerals of FIG. 1 apply.

Figure 7:
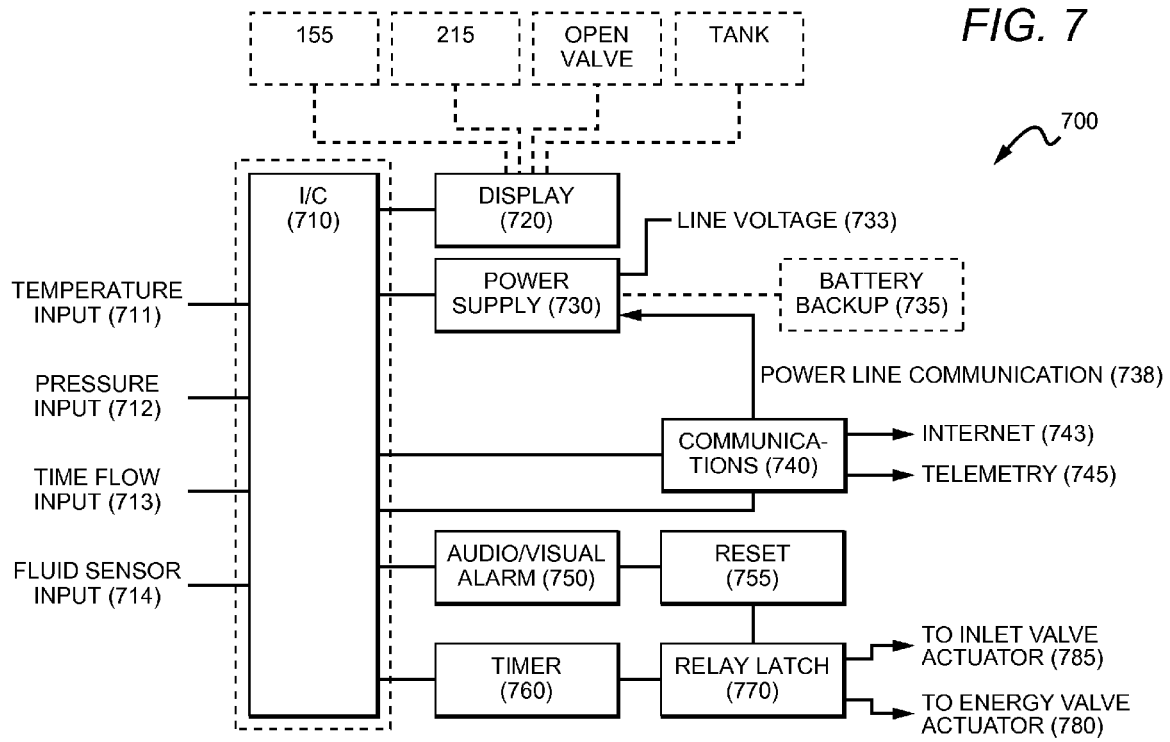
FIG. 7 is a sectional view of the housing of FIG. 6.

In FIG. 7, a diagram of system 700 is shown that includes an integrated controller 710. The integrated controller 710 can be configured to receive a temperature input 711 or pressure input 712 produced by a temperature or pressure sensor, respectively. The controller 710 can also be configured to receive a time flow input 713 produced by a fluid flow sensor, for example. Optionally, the controller 710 can be further configured to receive a fluid input 714 from a sensor that monitors for the presence of liquids beneath a water heater.

Controller 710 can be coupled to a display 720 that can be configured to output the current pressure/temperature of a water heater. The display 720 can also be configured to show a current status of a relief valve such as to indicate whether the relief valve is opened or closed.

An audio/visual alarm 750 can also be coupled to the controller 710 such that allow the controller 710 can set off the audio/visual alarm 750 as a function of the temperature input 711, pressure input 712, time flow input 713, or fluid sensor input 714. For example, by monitoring the pressure or temperature inputs 711 and 712, and comparing the pressure/temperature with predetermined thresholds, a failure of a relief valve can be determined if the temperature or pressure exceeds those thresholds. In addition, by monitoring the duration of water flow to a drain pipe using the time flow input 713 and a timer 760 coupled to the controller 710, it can be determined if the relief valve is stuck in an open position if a water flow is detected for greater than a defined interval. Furthermore, controller 710 can receives a fluid sensor input 714 from a liquid sensor to determine if liquid is present outside of a water heater.

Should any problems exist, the controller 710 could activate audio/visual alarm 750 to alert a user of the problem(s). A reset circuitry 755 can be coupled to the controller 710, and configured to deactivate the audio/visual alarm 750. The reset circuitry 755 is preferably activated by a button or switch, such as that shown in FIG. 6A.

The controller 710 can be coupled to a relay latch 770 that is configured to communicate signals from the controller 710 to various components of the system 700. For example, the controller 710 could send a signal through the relay latch 770 to an energy valve actuator 780 to thereby restrict a flow of gas or electric current to a water heater. In addition, the controller 710 could send a signal through the relay latch 770 to an inlet valve actuator 785 to thereby restrict a flow of water to the water heater. In this manner, system 700 can limit the amount of energy and water wasted due to the failed relief valve.

The controller 710 can further be coupled to electronics 740 that allow the controller 710 to communicate over a wired connection such as Ethernet 743 or using power line communication 738, for example. The electronics could be configured to allow the controller 710 to communicate over a wireless connection such as Bluetooth, radio frequency, infrared, WIFI or other telemetry 745. The electronics 740 could be disposed within a housing of the controller 710, or disposed in a power supply 730 or other external housing coupled to the controller 710.

The controller 710 is coupled to a power supply 730. The power supply can be coupled to a line voltage 733 and optionally coupled to a battery backup 735. Alternatively or additionally, the power supply 730 could be coupled to a photovoltaic cell (not shown).

FIG. 8 illustrates an embodiment of a sensor housing 809 that houses a sensor 808 that can monitor a temperature and pressure within a conduit. The sensor housing 809 advantageously includes threaded ends, such that the sensor housing 809 can be easily coupled to an existing conduit. The sensor housing can be composed of stainless steel or any other commercially suitable materials or combinations thereof.

FIG. 9 presents methods 900 of reducing insurance premiums for insurance policies covering residential or commercial structures. In step 910, information is received about a system that monitors a relief valve coupled to a water heater of a structure covered by the insurance policy. The information preferably indicates whether or not the structure has a system to monitor the relief valve such that a flow of gas or electric current to the water heater can be restricted if a temperature or pressure of the water heater exceeds predetermined thresholds.

In step 920, the insurance premium for the insurance policy covering the structure is determined based upon the information, and the determined premium is less than a premium for a second structure that is based upon a second information and indicates the structure lacks the system of the first structure.

In optional step 925, the determined premium can be electronically communicated to a customer such as via a website, electronic mail, text message, and so forth.

Figure 10:
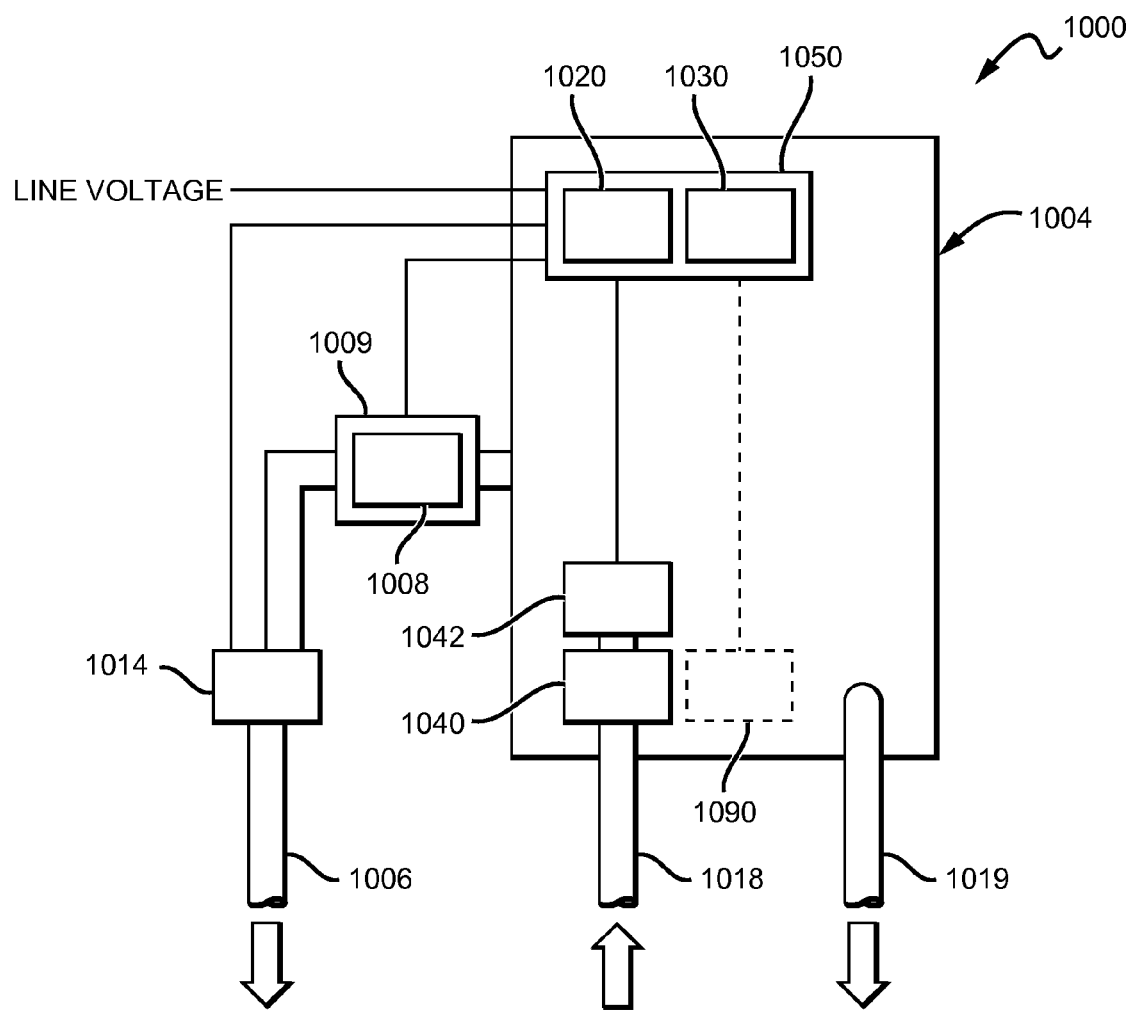
FIG. 10 is a plan view of a system for monitoring a status of a relief valve of a tankless water heater.

In FIG. 10, system 1000 is shown that restricts a flow of gas, electric current, or other energy source to tankless water heater 1004 based upon a signal received from first sensor 1008 or second sensor 1014. The system 1000 includes controller 1020 that is integrated into a circuitry 1050 of the tankless water heater 1004, although it is contemplated that the controller 1020 could be disposed in a housing separate from the water heater's circuitry 1050.

System 1000 can also include a valve actuator 1042 that is operatively coupled to a water inlet valve 1040 to control a water flow to the water heater 1004. The tankless water heater 1004 optionally can include a third sensor 1090 that monitors a coil of the tankless water heater 1004. With respect to the remaining numerals in FIG. 10, the same considerations for like components with like numerals of FIG. 1 apply.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system that monitors a flow of water in a drain pipe that is coupled to a relief valve of a water heater, comprising:
   a first sensor that monitors a temperature or pressure of the water heater to produce a first signal;
   a second sensor that monitors the flow of water to the drain pipe to produce a second signal; and
   a controller that (1) receives the first and second signals, and (2) restricts (a) a flow of gas or (b) an electric current to the water heater as a first function of at least one of the first and second signals.

2. The system of claim 1, further comprising:
   a first valve that regulates a flow of water to the water heater;
   a first valve actuator that operates the first valve; and
   wherein the controller controllably communicates with the first valve actuator as a second function of the first or second signal.

3. The system of claim 2, wherein the controller directs the first valve to be closed when the flow of water to the drain pipe exceeds a predetermined threshold.

4. The system of claim 1, wherein the first sensor monitors the temperature of the water heater, and further comprising a third sensor that monitors the pressure of the water heater to produce a third signal, wherein the controller restricts (a) the flow of gas or (b) the electric current to the water heater as a second function of the third signal.

5. The system of claim 1, wherein the controller restricts (a) the flow of gas or (b) the electric current to the water heater when the flow of water to the drain pipe exceeds a predetermined threshold.

6. The system of claim 1, wherein the controller further comprises electronics that transmit a status signal to a remote monitor.

7. The system of claim 1, wherein the controller has electronics configured to receive power via a line voltage.

8. The system of claim 7, wherein the electronics are further configured to transmit a status signal over a power line.

9. The system of claim 1, wherein the relief valve is at least partially disposed within a housing of the controller.

10. The system of claim 1, further comprising an alarm coupled to the controller, and wherein the controller is further configured to activate the alarm as a function of the first or second signal.

11. The system of claim 10, wherein the alarm comprises a status light.

12. The system of claim 10, wherein the alarm comprises an audio emitter.

13. The system of claim 10, further comprising a reset switch coupled to the controller, such that actuating the reset switch deactivates the alarm.

14. The system of claim 1, further comprising a third sensor that monitors a presence of fluid externally to the water heater, and wherein the controller is further configured to restricts (a) the flow of gas or (b) the electric current to the water heater as a second function of at least one of the first and second signals.

15. The system of claim 14, wherein the third sensor is configured to wirelessly communicate with the controller.

16. The system of claim 1, wherein the first and second sensors are coupled to the relief valve, and wherein the first sensor monitors a pressure in the relief valve and the second sensor monitors a flow of water from the relief valve to the drain pipe.

17. The system of claim 1, wherein the water heater is tankless, and wherein the controller is integrated into a circuitry of the water heater.

18. A system that monitors a water heater having a relief valve, comprising:
    a first sensor that monitors a temperature or pressure of the water heater to produce a first signal, wherein the first sensor is coupled to the relief valve;
    a second sensor that monitors the flow of water in the relief valve to produce a second signal; and
    a controller that (1) receives the first and second signals, and (2) activates at least one of (a) a visual alarm and (b) an audible alarm as a function of at least one of the first and second signals.

* * * * *